United States Patent
Groenendijk et al.

(10) Patent No.: US 9,692,671 B2
(45) Date of Patent: Jun. 27, 2017

(54) METHOD AND APPARATUS FOR AUTOMATICALLY DETERMINING CAUSES OF SERVICE QUALITY DEGRADATION

(75) Inventors: Jan Groenendijk, Athlone (IE); Johan Christer Wilhelm Granath, Stockholm (SE); Yangcheng Huang, Athlone (IE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 135 days.

(21) Appl. No.: 14/414,649

(22) PCT Filed: Jul. 4, 2012

(86) PCT No.: PCT/EP2012/062994
§ 371 (c)(1),
(2), (4) Date: Jun. 12, 2015

(87) PCT Pub. No.: WO2014/005627
PCT Pub. Date: Jan. 9, 2014

(65) Prior Publication Data
US 2015/0304191 A1    Oct. 22, 2015

(51) Int. Cl.
*H04L 12/26* (2006.01)
*H04L 12/24* (2006.01)
(Continued)

(52) U.S. Cl.
CPC ........ *H04L 43/0823* (2013.01); *H04L 1/1854* (2013.01); *H04L 1/1887* (2013.01);
(Continued)

(58) Field of Classification Search
None
See application file for complete search history.

(56) References Cited

U.S. PATENT DOCUMENTS

| 2008/0032677 A1* | 2/2008 | Catovic | H04W 72/02 455/414.1 |
| 2010/0284293 A1* | 11/2010 | Watanabe | H04L 41/5003 370/252 |
| 2010/0332906 A1* | 12/2010 | Agrawal | H04L 41/0631 714/37 |

FOREIGN PATENT DOCUMENTS

| WO | 02/10944 A1 | 2/2002 |
| WO | 2004/008763 A1 | 1/2004 |

(Continued)

OTHER PUBLICATIONS

PCT International Search Report, mailed Apr. 3, 2013, in connection with International Application No. PCT/EP2012/02994, all pages.
(Continued)

*Primary Examiner* — Eunsook Choi
(74) *Attorney, Agent, or Firm* — Leffler Intellectual Property Law, PLLC (57) ABSTRACT

Causes of service quality degradation in a communication network are determined for automated root cause analysis by identifying occurrence of degradation in service quality within a user session; identifying an underperforming resource of the communication network during occurrence of said identified degradation in service quality; in response to determining that the underperforming resource has at least one dependant resource, identifying any underperforming dependant resources during occurrence of said identified degradation in service quality; and outputting a plurality of causes of the service quality degradation including the identity of each of the identified underperforming resources.

13 Claims, 10 Drawing Sheets (51) Int. Cl.
*H04L 1/18* (2006.01)
*H04L 5/00* (2006.01)

(52) U.S. Cl.
CPC .......... *H04L 5/0087* (2013.01); *H04L 5/0092* (2013.01); *H04L 5/0096* (2013.01); *H04L 41/5032* (2013.01); *H04L 41/5035* (2013.01); *H04L 41/5067* (2013.01); *H04L 41/065* (2013.01); *H04L 41/0636* (2013.01); *H04L 43/0829* (2013.01); *H04L 43/0864* (2013.01); *H04L 43/0882* (2013.01); *H04L 43/16* (2013.01)

(56) References Cited

FOREIGN PATENT DOCUMENTS

| WO | 2008/121062 A1 | 10/2008 |
| WO | 2011/012173 A1 | 2/2011 |
| WO | 2013044974 A | 4/2013 |

OTHER PUBLICATIONS

"Keeping the Customer Service Experience Promise" Ericsson White Paper 284 23-3150 Uen, Jan. 2011, pp. 1-9.
Holm-Oste, G. et al. "Ericsson's User Service Performance Framework" Ericsson Review No. 1, 2008, pp. 43-46.
Shalunov, S. et al. "A One-Way Active Measurement Protocol (OWAMP)" RFC 4656, The Internet Society, Sep. 2006, pp. 1-57.
Hedayat, K. et al. "A Two-Way Active Measurement Protocol (TWAMP)" RFC 5357, The Internet Society, Oct. 2008, pp. 1-27.
Morton, A. et al. "Framework for Metric Composition" RFC 5835, The Internet Engineering Task Force (IETF), Apr. 2010, pp. 1-19.

* cited by examiner

| Imp. SySe / dep. ReSe | Accessibility | Retainability | I: TP sensitive | I: Latency sensitive | I: Error sensitive | I: Loss sensitive |
|---|---|---|---|---|---|---|
| Accessibility | X | - | - | - | - | - |
| Retainability | - | X | - | - | - | - |
| I: Throughput | - | –(per def) | X | X | - | - |
| I: Latency | - | –(per def) | X | X | - | - |
| I: Error | - | –(per def) | O | O | X | - |
| I: Loss | - | –(per def) | OY | O | - | X |

Resending:
O: means has impact/dependency and resending present
Y: means has impact/dependency and no resending
X: means has impact/dependency and resending is not relevant

For this service instance at t=24 sec

|      | SySe | T1  | T2  | L1 | L2 | c-A | R   |
|------|------|-----|-----|----|----|-----|-----|
| A    | ok   | -   | -   | -  | -  | -   | -   |
| R    | ok   | -   | -   | -  | -  | -   | -   |
| I(T) | 35   | -   | -   | -  | -  | -   | -   |
| I-T  | -    | 400 | 400 | 90 | 35 | 35  | 395 |
| I-L  | -    | 1   | 1   | 2  | 2  | 5   | 1   |
| I-E  | -    | 0   | 0   | 0  | 0  | 0   | 0   |
| I-D  | -    | 0   | 0   | 0  | 0  | 0   | 0   |

METHOD AND APPARATUS FOR AUTOMATICALLY DETERMINING CAUSES OF SERVICE QUALITY DEGRADATION

TECHNICAL FIELD

The present invention relates to a method and apparatus for automatically determining causes of service quality degradation in a communication network for automated root cause analysis.

BACKGROUND

One of the primary responsibilities of service providers is to ensure that their services provide a level of performance and robustness that satisfies the commitments specified in their Service Level Agreements (SLAs) with customers.

An existing approach is to monitor the quality and behaviour of the services by measuring system-internal performance characteristics (such as round trip delay, available bandwidth and loss ratio), identify unusual or anomalous activity that either directly indicates or indirectly implies that the service is no longer behaving satisfactorily, and identifying (root) causes of service performance degradations.

It has been proposed to provide measurement and metadata from the network resources and utilise the metadata to enable a system to automatically generate the topology and dependencies between the resources to assist in identifying root causes.

Besides the measurements and topology, logic and decision criteria are needed to automatically find the cause of service degradation. Today's solutions do not apply a generic methodology that solves this problem for all system services, merely specific solutions for a specific system service are developed where the problem cause is known in advance and the root cause analysis system may come to a result using decision trees or other likewise methodologies.

Existing solutions which are based on decision trees rely on probabilities or priorities (to decide which branch the reasoning shall go ahead with). There are many disadvantages to use of decision trees. For example, in order that priorities or probabilities can be determined, a training or "learning" period is needed. Furthermore, the priorities or probabilities that have been assigned to a decision may not be accurate. A decision tree may miss causes of service degradation because of earlier decisions (based on probabilities) to decide which branch to follow for further processing misses out a cause present in another branch which has not been followed. Further, a decision tree may not reflect real-time network status when calculating probabilities.

Existing solutions provide complex systems and algorithms for analysis of alarms and measurements to find specific service problems. The actual automation for finding the offending resource is often limited to specific problems and only works after the service has been delivered. With these solutions it takes times to find the root cause of service degradation, making the system limited and impractical to implement for real time analysis.

Existing solutions for network-wide measurement and performance estimation pay little attention to requirements for compatibility or inter-operability. These systems are usually point solutions, use different performance metrics, employ various underlying measurement mechanisms, and often operate off-line only. Though diverse in underlying mechanisms, these systems have the common goal of providing system-internal characteristics to applications, and their measurements overlap significantly.

Furthermore, existing solutions require complex systems and domain specific knowledge in order to correlate information from different resources to be able to find the root cause.

Existing solutions also rely on unstructured network measurements and thus try to make the best out of the available measurements. The lack of metadata and co-relation information in a node of a network providing measurements makes it very hard to correlate measurements from different resources especially at a session level.

Due to the lack of inter-operability between data sources, existing Root Cause Analysis (RCA) solutions require huge human intervention; automation in existing root cause analysis solution has very limited usage in today's telecommunication networks with heterogeneous resources and services.

Probe based solutions provide measurements but lack the metadata and addressing information from the resources involved in the service delivery to enable a large degree of automation.

SUMMARY

The present invention seeks to obviate at least some of the disadvantages of the prior art systems and provide automated, near real time, root cause analysis using simple decision logic applied to measurements from network resources.

This is achieved, according to an aspect of the present invention, by a method for automatically determining causes of service quality degradation in a communication network for automated root cause analysis. Occurrence of degradation in service quality within a user session is identified. An underperforming resource of the communication network during occurrence of the identified degradation in service quality is identified. In response to determining that the underperforming resource has at least one dependant resource, any underperforming dependant resources during occurrence of the identified degradation in service quality are identified. A plurality of causes of the service quality degradation including identity of the identified underperforming resources is output.

This is also achieved, according to another aspect of the present invention, by apparatus for automatically determining causes of service quality degradation in a communication network for automated root cause analysis. The apparatus comprises a processor configured to: identify occurrence of degradation in service quality within a user session; identify an underperforming resource of the communication network during occurrence of the identified degradation in service quality; in response to determining that the underperforming resource has at least one dependant resource identify any underperforming dependant resources during occurrence of the identified degradation in service quality. The apparatus also comprises an interface configured to output a plurality of causes of the service quality degradation including identity of the underperforming resources identified by the processor.

This is achieved, according to yet another aspect of the present invention, by a communication network comprising a plurality of resources and apparatus for automatically determining causes of service quality degradation in a communication network for automated root cause analysis. The apparatus comprises a processor configured to: identify occurrence of degradation in service quality within a user session; identify an underperforming resource of the communication network during occurrence of the identified degradation in service quality; in response to determining that the underperforming resource has at least one dependant resource identify any underperforming dependant resources during occurrence of the identified degradation in service quality. The apparatus also comprises an interface configured to output a plurality of causes of the service quality degradation including identity of the underperforming resources identified by the processor.

BRIEF DESCRIPTION OF DRAWINGS

For a more complete understanding of the present invention, reference is now made to the following description taken in conjunction with the accompanying drawings in which.

DETAILED DESCRIPTION

The terms "System Service Key Performance Indicator" ("S-KPI"), and "Resource Service Key Performance Indicator" ("R-KPI") and are defined by the Ericsson USP (User Service Performance) concept. The USP concept is explained in the recent publications "Keeping the Customer Service Experience Promise", January 2011 http://www.ericsson.com/res/docs/whitepapers/wp_service_assurance.pdf and an article G. Holm-Oste and M. Norling. Ericsson's User Service Performance Framework. *Ericsson Review*, (1):43-46, 2008 http://www.ericsson.com/ericsson/corpinfo/publications/review/2008_01/files/7EricssonsUserService-.pdf The USP concept is further disclosed by the patent publication no. WO/2008/121062.

Figure 1:
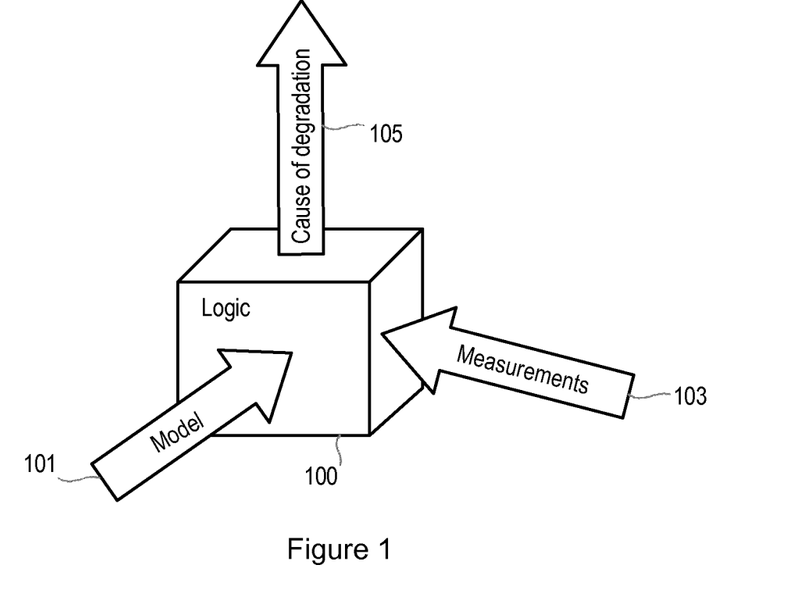
FIG. 1 is a simplified schematic of apparatus for automatically determining a cause of service quality degradation according to an embodiment of the present invention.

The basic concept of the RCA logic of an embodiment of the present invention is shown in FIG. 1. The logic 100 (RCA-logic) receives measurements 103 from the network resources and a resource topology 101. The measurements and resource topology may be provided in the form of measurements and metadata received from network resources to automatically generate the topology and dependencies between the resources (not described in detail here). Other methods, for example, collecting measurements and metadata from Operations Support System (OSS), instead of directly reporting from nodes for providing these inputs may be utilised in the logic 100 of FIG. 1.

The RCA-logic 100 consists of rules and algorithms that are applied to the resource service objects for which performance measurements 103 are continuously collected. In an alternative embodiment, the performance measurements 103 may be sampled over a continuous period or, alternatively may be collected or sampled over a predetermined time interval. When degradation in service quality is detected, for example a system service breach is detected, the RCA-logic 100 is applied and the performance of a first resource service object is assessed. Any dependant resources are identified and if it is determined that there is at least one dependant resource, the logic is applied and each dependant resource is assessed. The dependency resource topology (dependency relation between the resource service objects) may be known. Only the underperforming part of the resource topology, i.e. the part that contains the underperforming resources is further traversed as described in more detail below. Therefore, the resource service objects that are performing well may be excluded from the analysis, thus making the analysis faster.

The RCA-logic is deterministic and consists of rules and algorithms. The RCA-logic is typically implemented in one or more software modules.

Figure 2:
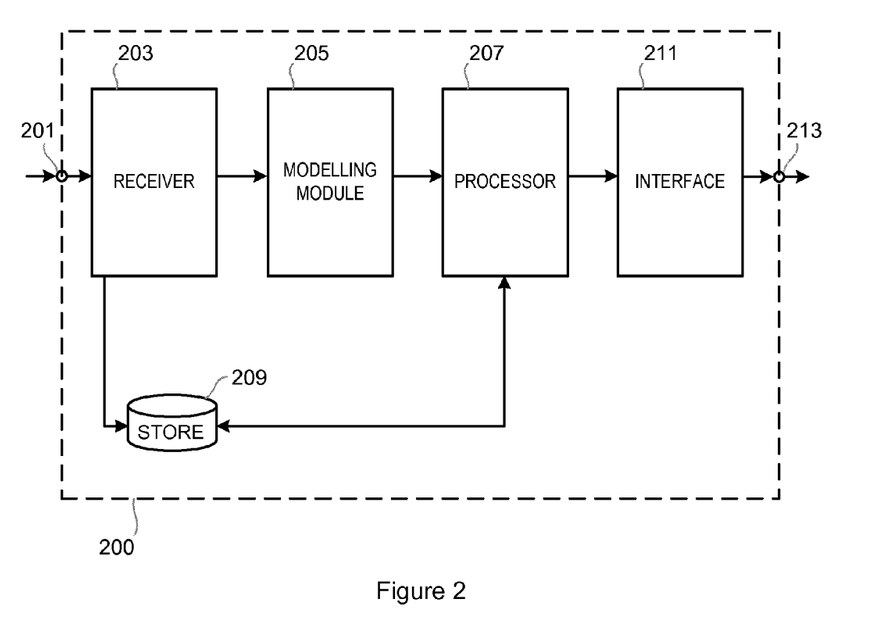
FIG. 2 is a simplified schematic of the apparatus for automatically determining a cause of service quality degradation according to an embodiment of the present invention.

With reference to FIG. 2, the apparatus 200 according an embodiment of the present invention for automatically determining causes of service quality degradation in a communication network for automated root cause analysis comprises a processor 207 configured to: identify occurrence of degradation in service quality within a user session; identify an underperforming resource of the communication network during occurrence of the identified degradation in service quality; in response to determining that the underperforming resource has at least one dependant resources, identifying any underperforming dependant resources; and an interface 211 configured to output a plurality of causes of the service quality degradation including each of the underperforming resources identified by the processor 207.

The processor 207 is connected to the input of the interface 211. The output of the interface 211 is connected to an output terminal 213 of the apparatus 200.

The processor is also connected to a storage device 209. The storage device 209 may be integral with the apparatus 200 as shown in FIG. 2 or it may be external thereto. The processor is also connected to the output of a modelling module 205. The input of the modelling module 205 is connected to the output of a receiver 203. The input of the receiver 203 is connected to an input terminal 201 of the apparatus 200. The receiver 203 is also connected to the storage device 209.

Operation of the apparatus 200 will now be described with reference to FIG. 3. The method 300 according an embodiment of the present invention for automatically determining causes of service quality degradation in a communication network for automated root cause analysis comprises the steps of: identifying 301 occurrence of degradation in service quality within a user session; identifying 303 an underperforming resource of the communication network during occurrence of the identified degradation in service quality; in response to determining that the underperforming resource has at least one dependant resource, identifying 305 any underperforming dependant resources during occurrence of the identified degradation in service quality; and outputting 307 a plurality of causes of the service quality degradation including the identity of each of the identified underperforming resources.

A plurality of measurements and metadata from each node is received on the input terminal 201 of the apparatus 200 and the receiver 203. The raw measurement is processed, for example, the data stream may be parsed as known in the art and the measurement data and metadata is forwarded to the storage device 209 for storage until needed by the processor for RCA. The metadata is also forwarded to the modelling module 205. The modelling module 205 determines the topology of the network. This may be determined from metadata sent with the measurements from the network resources (not described in detail here).

The processor 207 is then triggered by an event to carry out RCA. Alternatively, the processor may carry out the RCA at predetermined time intervals or in response to a specific type of system service breach as described in more detail below. The processor 207 then executes the steps of FIG. 3 as described above by retrieving the topology from the modelling module 205 and the measurement data from the storage device 209. The plurality of causes of the service degradation, including the identity of the underperforming resources, is output by the processor 207 to the interface 211 where it is formatted for output on the output terminal 213 of the apparatus 200. The plurality of output causes may be linked to form a chain of causes. Each link defined the relationship between each of the underperforming resources with respect to each other.

The embodiment of the present invention will now be described in more detail below.

When service quality degradation is detected, the need of information is governed by which aspect is affected. If it is an additive aspect like latency, a budget over the network is required. If the breach which caused the degradation is so large in one of the identified underperforming resources that it exceeds the total threshold of the whole system, it's obvious that this underperforming is the (but not necessary all) cause for the service quality degradation.

An underperforming resource that is the cause of service quality degradation may be found by using a model that describes the resources services from a level (top level resource service) that relates to the system service. The resource service performance is continuously measured and the measurements are stored for the event that a root cause analysis is required. The measurements are used when a dependant system service is breached. If the top level resource service is underperforming (a first underperforming resource) the next level in the resource service model is measured and assessed to find out which resource service dependant of the first underperforming resource is under performing using logical AND and resources budgets until the resource service is found that does not meet the target performance. The resource service furthest down the dependency topology that does not meet the required performance is the offending resource service.

By adopting a top-down approach in the RCA structure, resource service branches can be excluded at a higher level of the topology minimizing the computing effort for the analysis.

The performance of Resource Services that are modelled as connection objects is expressed through the following R-KPIs: accessibility; retainability and integrity. Integrity includes throughput; latency; error and loss.

All integrity parameters can be measured using statistical sampling methods in which case the parameter has an average value and a variation, when measuring latency, the variation in latency is jitter. An adequate sampling interval needs to be chosen to match the desired resolution of faults. This applies to all measured integrity aspects and is an integral part of this solution. Jitter is often used as attribute that describes the average variation in delay between packets. When delivering jitter sensitive services such as voice and video, buffers are used to reduce the effect of jitter on the media quality delivered to the consumer. The jitter can be derived from the latency measurements.

Figure 4:
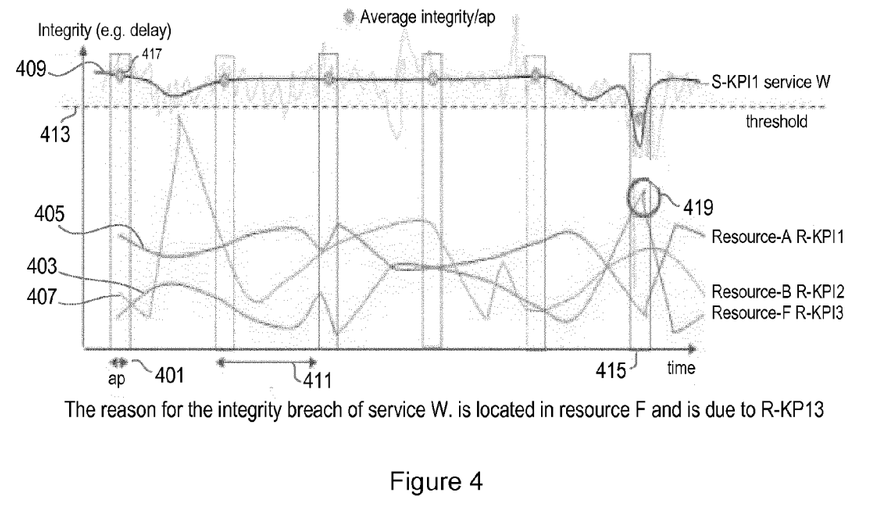
FIG. 4 is a graphical representation of an example of the relationships between system and resources services, sampling period and averaging period.

For Resource Service (ReSe) integrity, the measurement is not only done once but is made continuously during the session. ReSe integrity is measured with a sampling period 411 as illustrated in FIG. 4. The measurement of the service key performance indicator 409 (in this specific example the ReSe integrity) is made continuously during the session as samples of Throughput, Latency, Error rate, and Drop rate with a sampling period 411 in which each period is represented as a value 417 averaged during averaging period 401. A predetermined threshold 413 is provided and as shown in FIG. 4, the average value in the averaging period 415 falls below the threshold, indicating service quality degradation. Upon analysis of the resource key performance indicators 403, 405 and 407 for respective resources F, A and B, A peak is identified in the averaging period 415 at 419 in the resource key performance indicator 403 for resource F. Therefore resource F is identified as the underperforming resource.

Specifically, control object measurements are used to express the performance of functions providing setup, preservation and take down of connectivity resources used to produce system service sessions. The measurement of the performance of a control object contains: the start time of the first signal in a control procedure; the duration of all signalling exchange in a control procedure (execution time); the result of the signalling in a control procedure (result code) A control procedure can be composed of one or several signals procedures.

The performance of the control procedure relies partly on the performance of the user plane where the user plane provides the connection between two control procedure end points. This dependency is described in metadata in the control procedure measurements The RCA logic of an embodiment of the present invention has the ability to identify a root cause using measurements from the involved resource service object types and events. The following performance aspects describe the performance of a system or resource service: accessibility; retainability; and integrity.

Figure 5:
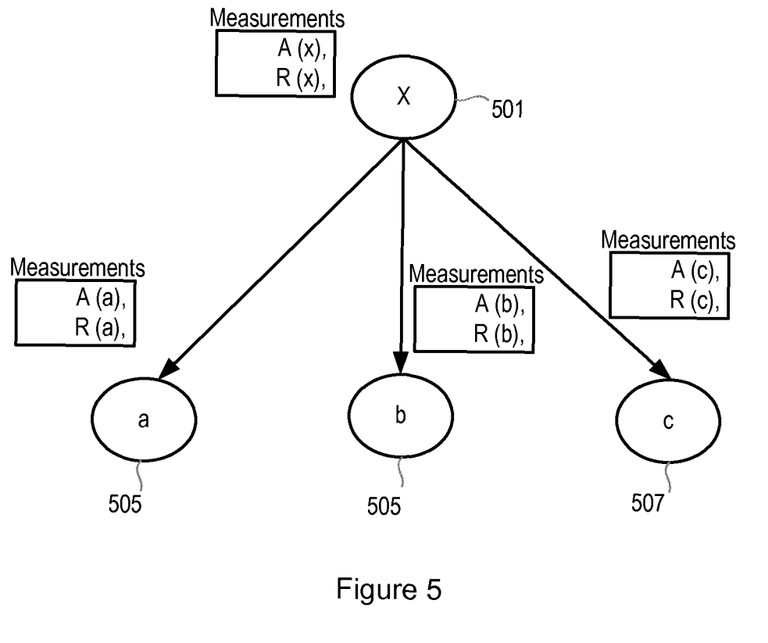
FIG. 5 illustrates a model for determining a resource having Accessibility and Retainability impairments according to an embodiment of the present invention.
Figure 6:
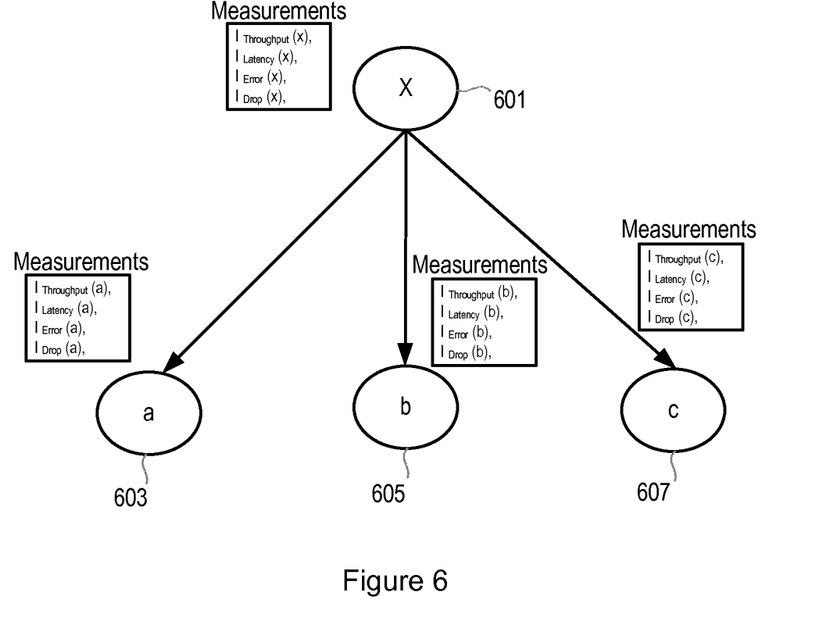
FIG. 6 illustrates a model for determining a resource having Integrity impairments according to an embodiment of the present invention.

A model for showing the relation between the performance of a service object (system or resource service) that depends on resource service objects is shown in FIG. 5 for Accessibility and Retainability and in FIG. 6 for Integrity.

The top level service object 501, 601 is a System Service while all lower level service objects 503, 505, 507, 603, 605, 607 are Resource Services. The System Service depends on one or more resource services. The model can be expanded both horizontally and vertically, i.e. a Resource Service depends on other Resource Services.

Figure 8:
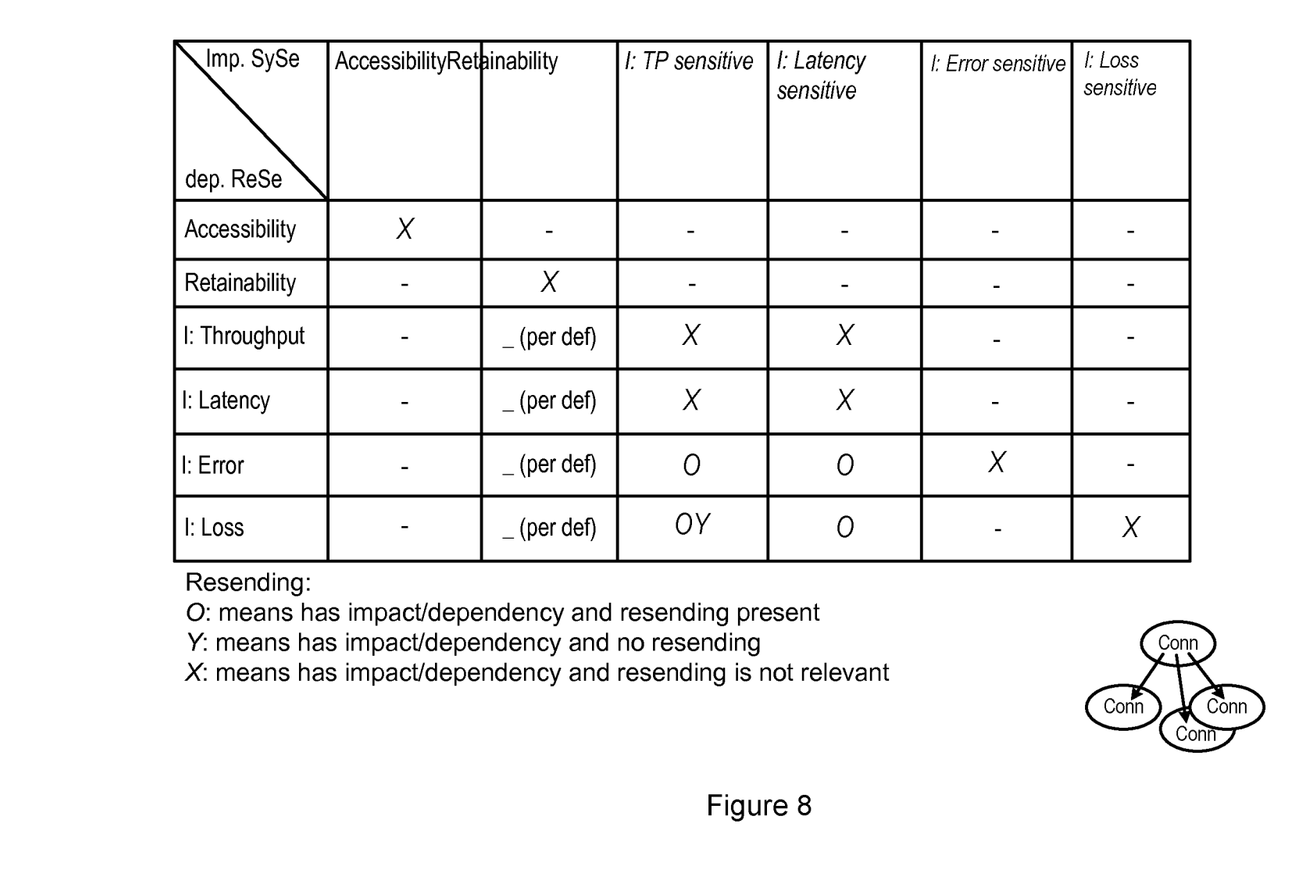
FIG. 8 is a table illustrating the relationships between impacted system services and depending resource services according to an embodiment of the present invention.

Performance measurements are used to determine if a System Service (SySe) 501, 601 is in breach. When the impacted SySe is found to be in breach (first underperforming resource identified), the performance of the dependant Resource Services (ReSes) 503, 505, 507, 603, 605, 607 is determined from ReSe performance measurements, the relation of the performance attributes between the SySe and the ReSe is shown in FIG. 8.

With reference to FIG. 5, the accessibility for an individual ReSe is a Boolean, i.e. the ReSe is either accessible or not accessible. The accessibility of, the resource 501, for example a connection X depends on that all the connections A, B and C (resources 503, 505, 507) are accessible. This is expressed through the following Boolean equation using the AND $\wedge$ operation:

$$A(x)=A(a) \wedge A(b) \wedge A(c)$$

The Boolean equation states that X is accessible if A and B and C are accessible.

If the accessibility of the impacted SySe x is in breach, the logic will determine (based on accessibility measurements from ReSe (a, b, c)) which of the dependant ReSe (a, b, c) will be the impacted ReSe or causing ReSe.

With reference to FIG. 6, the retainability for an individual ReSe is also a Boolean as the ReSe is either successfully retained (completed) or not retained.

The higher level retainability is uncompromised when all dependant lower level ReSes are either successfully released or still available when the higher level ReSe is successfully completed.

A ReSe is retained as long as all ReSes it depends on are retained.

For the expression the negative is used, i.e. the higher level ReSe 601 is not successful if any of the lower ReSe 603, 605, 607 is not successful. The fallibility of a ReSe is the negative of the retainability of a ReSe, say that the fallibility is expressed as F. The following Boolean equation using the OR $\vee$ operation and NOT $\neg$:

$$F(x)=F(a) \vee F(b) \vee F(c)$$

The conversion from fallibility to retainability gives the following result:

$$R(x)\neq \neg R(a) \vee \neg R(b) \vee \neg R(c)$$

The Boolean equation states that X is not retained if A or B or C is not retained. If the retainability of the impacted SySe x is in breach, the logic will determine (based on retainability measurements from ReSe (a, b, c)) which of the dependant ReSe (a, b, c) will be the impacted ReSe or causing ReSe.

Integrity is a class of performance. The Integrity of a ReSe: Connection is noted as $I_T$ for Throughput, $I_L$ for Latency or delay, $I_E$ for Error rate, and $I_D$ for Drop. The units in which the Integrity measurements are expressed depend on the ReSe provided. For example the ReSe E-line Service (Ethernet) defines the drop rate as frame loss, while a router defines the drop rate as packet loss. Connections in the model are connected through nodes, in the model a connection stretches into the node halfway. When the node effects have to be taken into account, for example delay half of the delay in the node contributes to the ingress connection and half to the egress connection.

There are two aspects of throughput for a ReSe. The first aspect is the Utilized Throughput which is the measured actual throughput capability of a ReSe. The Utilized Throughput does not represent what the throughput should or could have been but rather what is actually transferred. The other aspect is the Available Free Throughput for a ReSe. The Available Free Throughput measurement shows if there is free capacity for the ReSe.

The Available Free Throughput of ReSe X is equal to the lowest Utilized Throughput of ReSe A, B and C. If one of the connections A, B, or C has an Available or Free Throughput of 0 then this ReSe is the offending resource. This is described in the following expression:

$$I_{Available}(x)=\text{Min. of } \{I_{Available}(a), I_{Available}(b), I_{Available}(C)\}$$

IF $I_{Available}(i)=0$

THEN ReSe (i) is (one of) the offending resource {i=a,b, or c}

If the throughput sensitive S-KPI of the impacted SySe x is in breach, the logic will determine (based on integrity measurements from ReSe (a, b, c)) which of the dependant ReSe (a, b, c) will be the impacted ReSe or causing ReSe.

The latency between the end-points is determined by the delay of each concatenated ReSe. Each ReSe has an individual delay budget, the performance of the ReSe has to be within its part of the complete system delay budget, if the system service degrades and the delay of the ReSe is not within the delay budget the lower layer ReSe have to be examined. The following arithmetical expression for latency applies:

$$I_{La}(x)=I_{La}(a)+I_{La}(b)+I_{La}(c)$$

The equation states that the Latency of X is the same as the sum of the Latency of A, B and C.

If the latency sensitive S-KPI of the impacted SySe x is in breach, the logic will determine (based on integrity measurements from ReSe (a, b, c)) which of the dependant ReSe (a, b, c) will be the impacted ReSe or causing ReSe.

The error rate of a ReSe depends on the error rate of the lower level ReSes. In the situation that all lower ReSe have an error rate of zero, the error rate of the higher level ReSe is also zero. An error in one ReSe may propagate (via the higher level ReSe) to another ReSe introducing statistical dependencies between the lower level ReSes.

Figure 7:
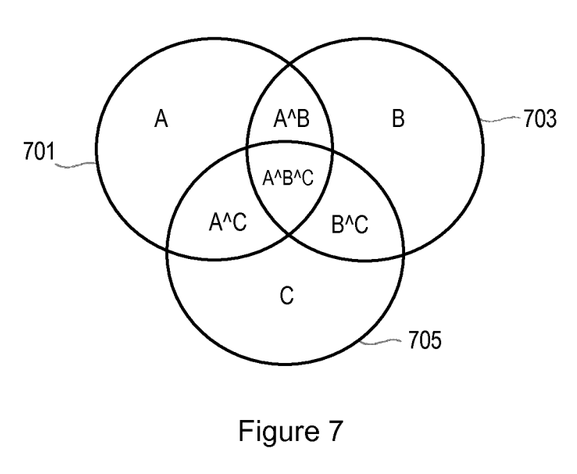
FIG. 7 is a Venn diagram showing an example of error sets in a Resource Service.

The relation between the errors on ReSe X and ReSe A, B, and C is shown as a Venn diagram in FIG. 7. The errors in ReSe X are the combined sets of errors in ReSe A, B, and C 701, 703, 705.

The relation shown in the Venn diagram can be expressed as:

$$I_E(x)=I_E(a)+I_E(b)+I_E(c)-I_E(a)\times I_E(b)-I_E(c)\times I_E(b)-I_E(a)\times I_E(c)+I_E(a)\times I_E(b)\times I_E(c)$$

The equation states that the errors/error rate in X is the sum of the errors/error rates of A, B and C minus the errors/error rate in A and B, C and B, A and C that have a common cause plus the errors in A, B and C that have a common cause.

If the error sensitive S-KPI of the impacted SySe x is in breach, the logic will determine (based on error rate measurements from ReSe (a, b, c)) which of the dependant ReSe (a, b, c) will be the impacted ReSe or causing ReSe.

The loss is the relation between packets that are fed into a ReSe and packet that reach the ReSe endpoint without being discarded or dropped. In the best case each ReSe has a drop rate of zero in which case the drop rate of the higher level ReSe is zero. The drop rate of each ReSe adds to the total drop rate. This is expressed as:

$$I_{Lo}(x)=I_{Lo}(a)+I_{Lo}(b)+I_{Lo}(c)$$

The equation states that the loss rate of X is the same as the sum of the loss rate in A, B and C.

If the loss sensitive S-KPI of the impacted SySe x is in breach, the logic will determine (based on loss measurements from ReSe (a, b, c)) which of the dependant ReSe (a, b, c) will be the impacted ReSe or causing ReSe.

The relationships between impacted SySe and dependant ReSe is shown in FIG. 8. From the table in FIG. 8, it can be seen that in case of a breach in throughput sensitive performance the dependant ReSe integrity assessment may involve throughput, latency, error and loss measurements. For a breach in latency sensitive performance the dependant ReSe integrity may involve throughput, latency, error and loss measurements.

Figure 9A:
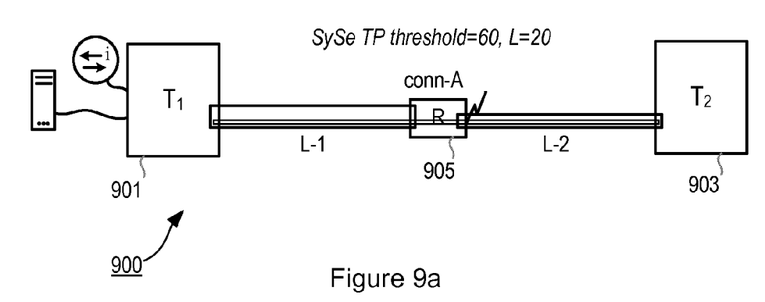
FIGS. 9a-c illustrate an example of determining the cause of service degradation in a communication network.
Figure 9B:
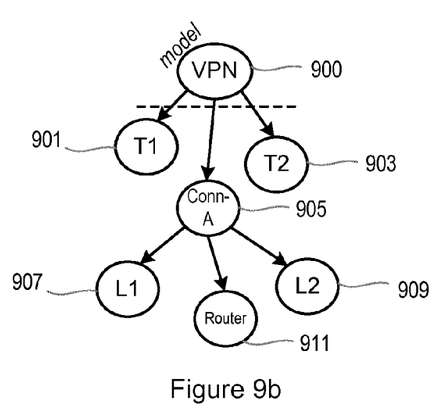
Figure 9C:
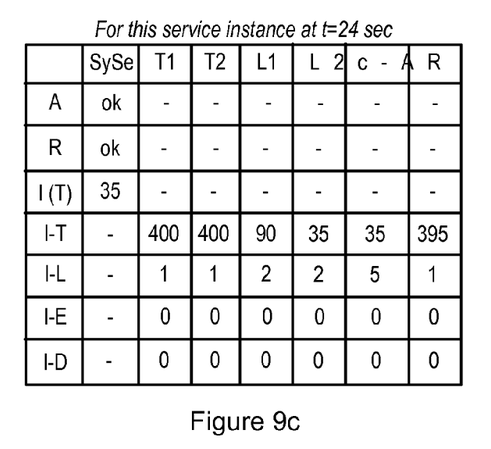

An example of analysis scenario is shown in FIGS. 9a, 9b, 9c. These figures show a VPN 900 comprising two terminals 901, 903 interconnected via a connection 905. The VPN 900 provides a SySe with the following performance requirements the throughput is at least 60 and latency no more than 20 as illustrated in FIG. 9c. From measurements the throughput performance of the VPN SySe is 35 as shown in FIG. 9c. Measuring the dependant ReSe shows that 905 has same throughput as the SySe in breach, the logic decides that the connection 905 becomes the underperforming resource and L1 907, L2 909 and router R 911 are the dependant resources. L2 909 shows same throughput as the connection 905 and is therefore the underperforming resource in this example there is no further dependant resources (i.e. further breakdown) and the result is that resource L2 909 is causing the service degradation due to throughput problems.

Upon detection of an S-KPI breach, the first step is to identify occurrence of service quality degradation by identifying an impacted SySe. In the case of an accessibility breach, the process identifies an underperforming resource; identifies any resources that are dependent on the identified underperforming resource's accessibility; apply the rules as specified above to determine which resource and R-KPI is the cause for the underperformance. This is repeated for all depending resources. The process is repeated for all subsequently identified dependant resources of one or all of the identified underperforming dependant resources.

Figure 3:
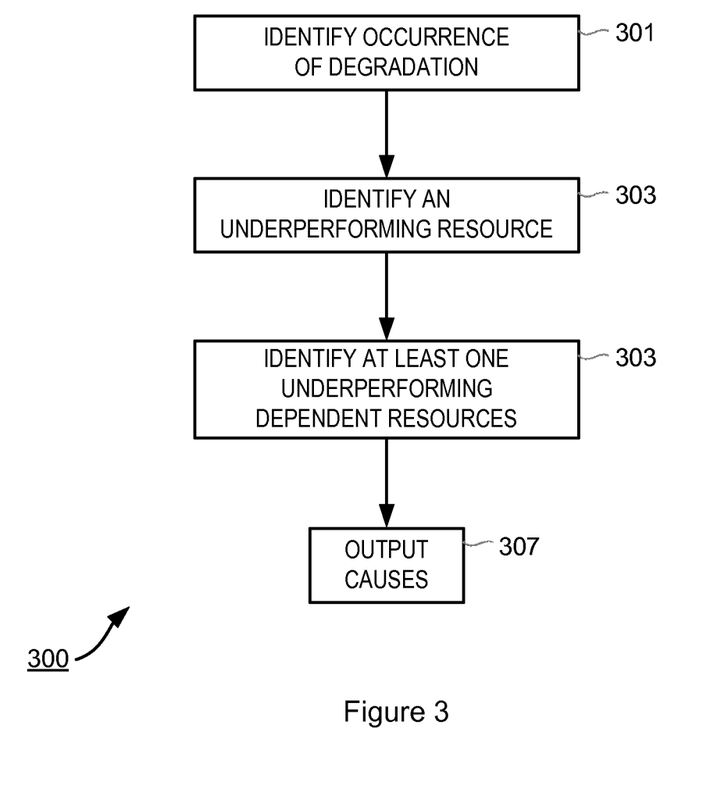
FIG. 3 is a flowchart of the method for automatically determining a cause of service quality degradation in a communication network according to an embodiment of the present invention.
Figure 10:
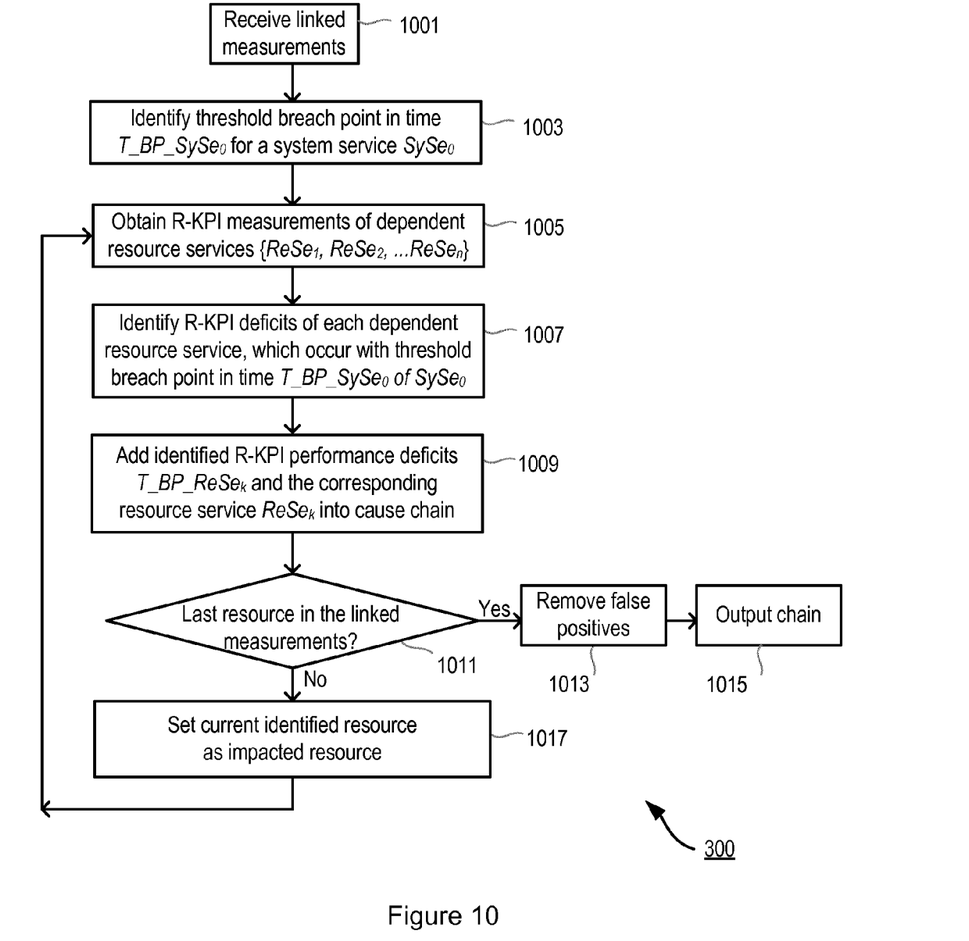
FIG. 10 is a more detailed flowchart of the method of FIG. 3.

Similarly if a retainability breach is detected, the process above is carried out except that any dependant resources are identified as those depending on the first underperforming resource's retainablilty Similarly if an integrity breach is detected, the process above is carried out except that any dependant resources are identified as those depending on the first underperforming resource's integrity The method of FIG. 3, according to an embodiment of the present invention, is shown in more detail in FIG. 10.

Linked measurement samples are received, step 1001. A threshold for the S-KPI and expected R-KPI performance may be predetermined or calculated "on the fly". Next the point in time of a threshold breach for a service session and the duration of the threshold breach is identified, step 1003, i.e. occurrence of degradation in a service quality is identified. The threshold breach of S-KPIs shall be co-occurring with R-KPI performance deficits of those dependant resources (i.e. underperforming resources). Then, the R-KPI measurements of each resource identified as dependant of the underperforming resource are obtained, step 1005. Next, R-KPI performance deficits of each dependant resource are identified from the R-KPI measurements which is correlated with the previously determined S-KPI breaches, step 1007, i.e. identifying underperforming resources, so that those deficits that are co-occurring with the S-KPI threshold breach identified in step 1003 are identified.

Clearly, only those R-KPI performance deficits co-occurring with the S-KPI threshold breach could lead to the performance degradation of the system service session. This is based on the assumption that degradation-starting of a service session shall be co-occurring (or with negligible propagation delay) with degradation-starting of a dependant resource service session.

For each resource, measurements of multiple integrity R-KPIs (packet loss, delay etc) may be available from linked measurements. Performance deficits of each R-KPI shall be examined.

All breaches (and the corresponding dependant resource performance deficits) shall be added into the cause chain as the potential causes of the performance degradation of the system service session, step 1009.

Iteratively apply steps 1005 to 1009 to each identified dependant resource, until the last resource in the linked measurements is reached, step 1011.

The last resource (together with its R-KPI performance deficit) is treated as the "root" cause of the degradation. Here "root" cause depends upon availability of measurements.

It is clear that not all of the identified breaches would be actual causes. At least it is possible that one of the breaches is non-relevant to the service degradation. Such false-positive underperforming resources are removed, step 1013.

Further false-positive underperforming resources that are removed from the chain in step 1013 are those resources for which no R-KPI performance deficits of a dependant resource are identified in step 1007 co-occurring with the S-KPI threshold breach identified in step 1003, the dependant resource shall be removed from the cause chain and no further drill-down would be carried out.

The chain of underperforming resources, showing the propagation of problems, originating from the root cause up to the service session is output at step 1015.

There are still possible false-positive offending resources in the output. Such inaccuracy can only be further removed using statistical analysis on multiple system service sessions.

The system according to the present invention provides the decision logic which is generic and requires no domain-specific knowledge to correlate information from different resources in order to find root causes in near real time. This facilitates automated network-wide holistic analysis based on measurements from different network domains. The resulting system is simplified whilst providing improved accuracy and faster analysis.

The system of the embodiment of the present invention output a chain of underperforming resources, instead of a single resource as root cause. Therefore, the output of the system clearly describes propagation of problems across a network. This facilitates further refinement of root causes through statistically analysis on cause chains from multiple service sessions.

The invention describes a method, algorithms and functions for automated root cause analysis by applying rules and decision to measurements of topologically related S-KPIs and R-KPIs per user session. The step of identifying an underperforming resource of the communication network comprises obtaining a plurality of resource key performance indicator measurements of a resource of the communication network; identifying deficits of any one of a resource key performance indicator of a resource during the occurrence of a service quality degradation; and wherein the step of identifying any underperforming dependant resources comprises obtaining a plurality of resource key performance indicator measurements of each resource dependant from a resource identified as underperforming; identifying deficits of any one of resource key performance indicators of each resource dependant from a resource identified as underperforming during the occurrence of a service quality degradation. As a result system standards are used to provide measurements across a range of service problems whilst providing compatibility and inter-operability.

Metadata provided with the measurements can be utilised to provide the identity of the underperforming resource, enabling full automation of the process.

Further, the topology of the resources is dynamically determined providing flexibility of the system to adapt to changes in the topology.

The step of identifying an underperforming resource comprising identifying an underperforming resource at the topmost level of the received topology and wherein the step of identifying any underperforming dependant resources comprises identifying any underperforming resources in the each of the next subsequent level from the previous upper level within the topology and identifying the last underperforming resource as the underperforming resource in the lowermost level. Use of such a drill down technique improves accuracy ensuring that any underperforming resources are not missed, improving accuracy whilst avoiding the requirement of use of a decision tree and thus obviating all the disadvantages of using a decision tree.

With dependency model embedded in linked measurements, the system of the embodiment of the present invention is fully automated, with no need of human intervention. This would significantly reduce OPEN and erroneous analytical results as a consequence of manual intervention.

The drill-down approach improves the accuracy of the RCA through analyzing overlaps between breaches and removing false-positive offending resources if no overlapped breaches are found.

Compared to solutions based on decision trees the system of the embodiments of the present invention has the following advantages: The algorithms can be applied directly to measurements, there is no learning required; the solution is more accurate in finding failure causes; near real time analysis provides faster method for finding failure causes Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims.

The invention claimed is:

1. A method for automatically determining causes of service quality degradation in a communication network for automated root cause analysis, the method comprising:
identifying occurrence of degradation in service quality within a user session;
identifying an underperforming resource of the communication network during occurrence of said identified degradation in service quality;
in response to determining that the underperforming resource has at least one dependent resource, identifying any underperforming dependent resources during occurrence of said identified degradation in service quality; and
outputting a plurality of causes of the service quality degradation including identity of the identified underperforming resources,
wherein the step of identifying any underperforming dependent resources comprises:
obtaining a plurality of resource key performance indicator measurements of each resource dependent from a resource identified as underperforming; and identifying deficits of any one of resource key performance indicators of each resource dependent from a resource identified as underperforming during the occurrence of service quality degradation.

2. A method according to claim 1, wherein the step of outputting a plurality of causes comprises:
adding identification information of a resource identified as underperforming and the cause of the underperformance to generate a cause object; and
outputting at least one link between each of the plurality of cause objects to output a chain of causes.

3. A method according to claim 1, wherein the step of identifying occurrence of degradation in service quality comprises:
identifying occurrence of degradation in service quality if a service quality falls below a service quality threshold.

4. A method according to claim 1, wherein the step of identifying occurrence of degradation in service quality comprises:
identifying the point in time that the degradation in service quality occurred and the duration of occurrence of the degradation in service quality.

5. A method according to claim 1, wherein the step of outputting a plurality of causes of the service quality degradation comprises:
removing resources identified as false-positives from the plurality of causes; and
outputting the remaining plurality of causes.

6. A method according to claim 1, wherein the step of identifying an underperforming resource of the communication network comprises:
receiving a plurality of measurements from a resource of a communication network, each of said plurality of measurements including an identifier associated therewith; and
determining if the at least one received measurement does not indicate a deficit of resource key performance indicator.

7. A method according to claim 6, wherein the method further comprises:
receiving identification information for the resource associated with each received measurement; and
determining the topology of the resources from the received identification information.

8. A method according to claim 7, wherein the step of identifying an underperforming resource comprises:
identifying an underperforming resource at the topmost level of the received topology; and
identifying any underperforming resources in the each of the next subsequent level from the previous upper level within the topology and identifying a last underperforming resource as the underperforming resource in the lowermost level.

9. An apparatus for automatically determining causes of service quality degradation in a communication network for automated root cause analysis, the apparatus comprising:
a processor; and
an interface,
wherein the processor is configured to:
identify occurrence of degradation in service quality within a user session;
identify an underperforming resource of the communication network during occurrence of said identified degradation in service quality; and
in response to determining that the underperforming resource has at least one dependent resource, identify any underperforming dependent resources; and the interface is configured to output a plurality of causes of the service quality degradation including identity of the underperforming resources identified by the processor, wherein identifying any underperforming dependent resources comprises:
   obtaining a plurality of resource key performance indicator measurements of each resource dependent from a resource identified as underperforming; and
   identifying deficits of any one of resource key performance indicators of each resource dependent from a resource identified as underperforming during the occurrence of service quality degradation.

10. The apparatus according to claim 9, wherein the apparatus further comprises:
   a receiver configured to receive a plurality of measurements from each of a plurality of resources of a communication network.

11. The apparatus according to claim 10, wherein the apparatus further comprises:
   a modelling module configured to determine the topology of the plurality of resources from the received plurality of measurements.

12. The apparatus according to claim 10, wherein the apparatus further comprises:
   a storage device for storing the received measurements.

13. A communication network comprising a plurality of resources and the apparatus of claim 9.

* * * * *